(12) United States Patent
Langewiesche

(10) Patent No.: US 7,677,854 B2
(45) Date of Patent: Mar. 16, 2010

(54) SELF-BORING AND SELF-TAPPING SCREW

(75) Inventor: Frank Langewiesche, Sprockhövel (DE)

(73) Assignee: SPAX International GmbH & Co. KG, Ennepetal (DE)

( * ) Notice: Subject to any disclaimer, the term of this patent is extended or adjusted under 35 U.S.C. 154(b) by 451 days.

(21) Appl. No.: 11/635,855

(22) Filed: Dec. 8, 2006

(65) Prior Publication Data

US 2007/0160440 A1  Jul. 12, 2007

(30) Foreign Application Priority Data

Jan. 12, 2006  (DE)  ............ 20 2006 000 479 U

(51) Int. Cl.
*F16B 25/00*  (2006.01)

(52) U.S. Cl. ............... 411/387.2; 411/386; 411/424

(58) Field of Classification Search ...... 411/386–387.8, 411/411, 424, 416, 311
See application file for complete search history.

(56) References Cited

U.S. PATENT DOCUMENTS

| | | | | |
|---|---|---|---|---|
| 373,074 | A * | 11/1887 | Jones | ............... 411/386 |
| 684,774 | A * | 10/1901 | Baggs | ............... 411/386 |
| 3,104,161 | A * | 9/1963 | Carlson | ............... 428/582 |
| 4,034,641 | A * | 7/1977 | Williams et al. | ...... 411/387.7 |
| 5,015,134 | A * | 5/1991 | Gotoh | ............... 411/386 |
| 5,295,774 | A | 3/1994 | Roberts | |
| 5,516,248 | A * | 5/1996 | DeHaitre | ............ 411/387.2 |
| 5,897,280 | A * | 4/1999 | Dicke | ............... 411/411 |
| 6,050,765 | A * | 4/2000 | McGovern et al. | ... 411/387.2 |
| 6,302,631 | B1 * | 10/2001 | Takasaki et al. | ......... 411/399 |
| 6,328,516 | B1 * | 12/2001 | Hettich | ............ 411/387.2 |
| 6,616,391 | B1 * | 9/2003 | Druschel | ............ 411/387.2 |
| 6,672,812 | B1 * | 1/2004 | Lin | ................ 411/387.2 |
| 2007/0224019 | A1 * | 9/2007 | Hale | ............... 411/387.2 |

FOREIGN PATENT DOCUMENTS

| | | |
|---|---|---|
| DE | 298 11 536 U1 | 11/1998 |
| FR | 1 469 665 | 2/1967 |

* cited by examiner

*Primary Examiner*—Flemming Saether
(74) *Attorney, Agent, or Firm*—Brinks Hofer Gilson & Lione

(57) ABSTRACT

The invention relates to a self-boring and thread-forming tapping screw having a screw shaft with a screw tip at one end and at the other end a force application member for the transmission of a turning moment. The screw shaft includes a threaded section with the screw tip and an adjacent thread-free section of the shaft including the force application member. The threaded section has a shaft core and a self-tapping thread. The threaded section includes a core section axially displaced from the tip and having a polygonal core cross section. Corners of the core cross section define an enveloping circle with an enveloping circle diameter larger than a shaft diameter of the thread-free section.

9 Claims, 2 Drawing Sheets

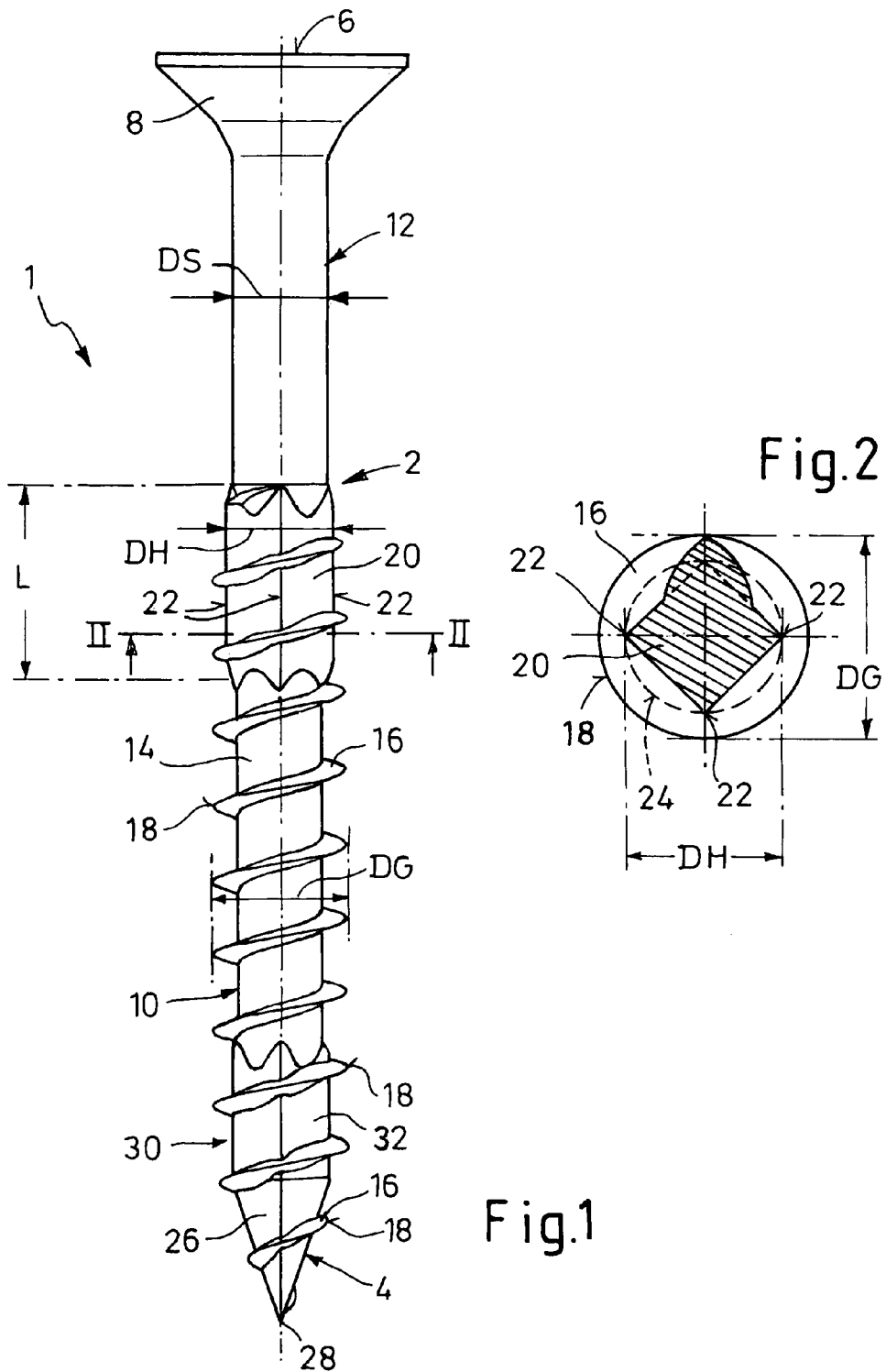

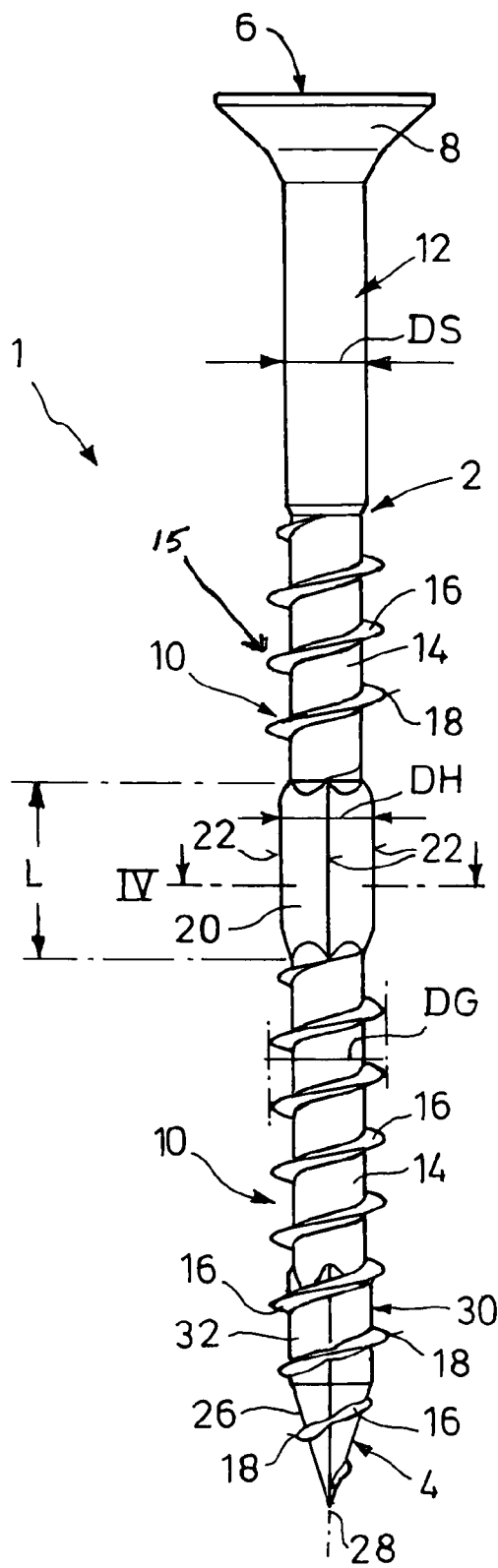
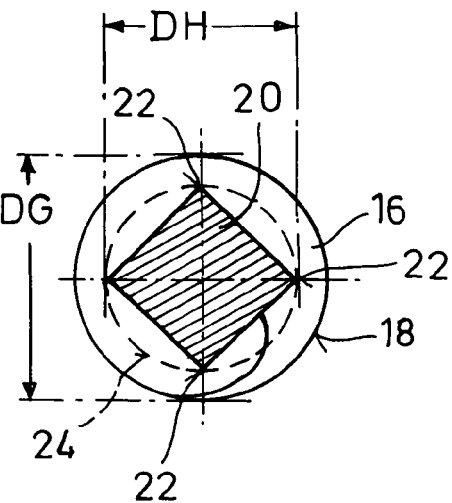
Fig. 3
Fig. 4

SELF-BORING AND SELF-TAPPING SCREW

CROSS REFERENCE TO RELATED APPLICATIONS

This application claims priority to German utility model number 20 2006 000 479.3, filed Jan. 12, 2006.

BACKGROUND

1. Field of the Invention

The present invention relates to a fastener. More specifically, the invention relates to a self-boring and self-tapping screw.

2. Description of Related Art

A shaft of screws of the above referenced kind include a thread-free section and are also designated as partially-threaded screws. They can be screwed directly without pre-drilling into relatively soft materials, such as wood and the like. In practice, the thread-free section of the shaft may generate high friction on entering the threaded hole formed by the threaded section. This leads to a disadvantageously high driving torque.

Some existing partially-threaded screws of this kind include a shaft cutter adjacent to the thread-free section of the shaft adjacent to the threaded section. The shaft cutter includes radially projecting cutting ribs intended to enlarge the threaded hole during driving to such an extent that the thread-free section of the shaft is able to penetrate with reduced friction and a reduced driving torque. However, manufacture of such screws by a rolling process may be problematic. Deformation of the screw by bending can occur in the area of the shaft cutter during rolling. This means that a straight screw cannot be easily produced, or can only be produced with additional cost.

The object of the present invention is to make an improved self-boring screw which is capable of being driven with a low driving moment and can be produced in a simple, economical and highly accurate manner.

SUMMARY

A self-tapping screw according to the present invention includes a shaft having a thread-free section, a threaded section, and a screw tip. A threaded section includes a core section displaced from the screw-tip having a polygonal core cross section. Corners of the core cross-section define an enveloping circle having an enveloping circle diameter larger than a shaft diameter of the thread-free section of the shaft. The polygonal core section and its corners cause the threaded hole to expand during driving of the screw. The result is that the friction and the driving torque are reduced as the thread-free section of the shaft penetrates into the threaded hole. Providing the polygonal core section in the area of the threaded section (and not in the area of the thread-free section of the shaft) results in improved production of the screw by a rolling process. In the rolling process, the screw is clamped between the roller jaws over the thread, including directly on the polygonal section. Thus, bending forces do not act on the axis of the screw. This permits simple and rapid manufacture with high precision in the rolling process.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

The invention will now be described in more detail with reference to the drawings, in which:

FIG. 1 depicts a side view of a screw according to the present invention in a first embodiment;

FIG. 2 depicts an enlarged cross section in the plane II-II of FIG. 1;

FIG. 3 depicts a side view of a second embodiment of the screw according to a second embodiment; and FIG. 4 depicts an enlarged cross section in the plane IV-IV of FIG. 3.

DETAILED DESCRIPTION

Turning to FIG. 1, a screw 1 according to the present invention includes a long and narrow screw shaft 2 extending from a screw tip 4 at one end to a screw head 8 at the other end. The screw head 8 further includes a force application member 6 for the transmission of a turning torque. In the depicted embodiments, the force application member 6 is embodied as an internal point of application of a force and as such is not shown in the side views. In addition, the force application member 6 is formed on or in the screw head 8, which is formed as a countersunk head. The force application member 6 can be formed as a cross-head, an internal hexagonal socket head, a hexalobular internal driving button head (TORX) or the like. It can also be an external point of application of a force, for example an external hexagonal socket head.

The screw shaft 2 includes a threaded section 10 also including the screw tip 4. A thread-free section of the shaft 12, having the force application member 6 and the screw head 8 is provided adjacent the threaded section 10. The thread-free section of the shaft 12 includes a cylindrical outer surface with a shaft diameter DS. The threaded section 10 has a shaft core 14 and a self-tapping thread 16. In the example depicted in FIG. 1, the self-tapping thread 16 is in the form of a radial elevation running in the form of a helical line. An external thread edge 18 is formed between two flanks of the thread 16. The thread 16 defines an external thread diameter DG.

The threaded section 10 has a core section 20 displaced from the screw tip 4. The core section 20 has a polygonal core cross section best shown in FIGS. 2 and 4. The polygonal core section 20 includes corners 22 that define an enveloping circle 24 having an enveloping circle diameter DH being larger than the shaft diameter DS of the thread-free shaft section 12. The enveloping circle diameter DH is preferably smaller than the thread diameter DG. The enveloping circle diameter DH may preferably be up to 1.4 times, and in particular between 1.1 and 1.2 times, the shaft diameter DS. For example, in an 8 mm screw where the thread diameter DG is 8 mm and the shaft diameter DS is about 5.6 mm, the enveloping circle diameter DH may lie in the range from about 6.2 mm to 6.4 mm.

In the embodiment illustrated in FIGS. 1 and 2, the thread 16 runs along the entire shaft core 14 of the threaded section 10 including the polygonal core section 20. As shown, the polygonal core section 20 may be arranged in the end area of the threaded section 10 (i.e., at the thread run-out) in direct proximity to the thread-free section 12 of the shaft 2. Improved straightness of the screw 1 is achieved during manufacture by a rolling process since the area of the polygonal core section 20 is guided precisely or clamped over the continuous thread 16 between two roller jaws. The thread 16 also passes over the area of the polygonal core section 20, viewed in an axial projection, with the outer thread edge 18 having a constant radius forming a circle (see FIG. 2). In another example, unlike the embodiment depicted in FIG. 1, the polygonal core section 20 including the thread 16 can also be disposed in the threaded section 10 at a greater distance from the thread-free section 12 of the shaft. In this case, a part of the "normal" thread with a cylindrical shaft core 14 is provided between the sections 20 and 12.

An the alternative embodiment is shown in FIGS. 3 and 4 where the polygonal core section 20 interrupts the thread 16 and is free of threads. An end area 15 of the threaded section 10, preferably including at least one complete turn of the thread 16, is provided between the polygonal core section 20 and the thread-free section 12 of the shaft. As shown in the example of FIG. 3, the end area 15 may include four complete turns of the thread. A part of the threaded section 10 is thus situated axially to either side of the polygonal core section 20, for guiding and to prevent distortion/bending during manufacturing when rolling the thread.

In both embodiments, the polygonal core section 20 includes an axial length L. The axial length L corresponds approximately to a length of the threaded section 10 having between one and six turns of the thread 16.

As can be appreciated, in addition to the examples of FIGS. 2 and 4, the polygonal core cross section of the core section 20 is preferably embodied as a four-sided figure (square or quadrilateral). However, it is possible, in other embodiments, to choose an equilateral, three-sided to six-sided figure as well. In addition, the lateral surfaces in any of the examples, unlike in the depictions, can be curved in a weakly concave or convex manner. The corners 22 should preferably be as square-edged as possible, but the corners 22 can be slightly rounded and remain within the scope of the present invention.

In a preferred embodiment of the invention, as shown in FIG. 3, the screw tip 4 also includes a tip core 26 having a polygonal core cross section. The thread 16 passes over a tapering area of the screw tip 4 as far as a pointed end 28 with the outer thread 18, viewed in an axial projection, defining a continuously reducing radius in the form of a spiral over the tip core 26. In addition, and preferably in conjunction with the screw tip 4 of the screw, a transitional section 30 is also provided. The transitional section 30 has a transitional core 32 with a constant polygonal core cross section over its axial length. The transitional core 32 cross section corresponds to the shape of the tip core 26 cross section that is directly adjacent in the area of the screw tip 4 of the screw. The thread 16 passes over the area of the transitional core 32 of the transitional section 30 in a similar manner to the rest of the threaded section 10, with its outer thread edge 18, viewed in an axial projection, having a constant radius in the form of a circle.

Similar to the core cross sections described above, the shape of the core cross sections of the tip core 26 of the screw tip 4 and the transitional core 32 of the transitional section 30, are preferably a quadrilateral or a square, or any in particular equilateral, three-sided to six-sided figure. The polygonal transitional core 32 of the transitional section 30 includes corners defining an enveloping circle (not shown), the diameter of which is larger than the diameter of the core 14 of the shaft but, on the other hand, is smaller than the enveloping circle diameter DH of the core section 20 according to the invention. This preferred embodiment described in the area of the tip 4 of the screw acts as a boring tip which permits improved centering and easy driving.

The present invention is not restricted to the illustrative embodiments depicted and described here, but also includes all embodiments of identical effect within the scope of the invention. Moreover, the invention is also as yet not restricted to the combination of characteristic features described, but can also be defined by any other desired combination of particular characteristic features of all previously disclosed individual characteristic features.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

I claim:

1. A self-boring and self-tapping screw comprising a screw shaft with a screw tip at one end extending axially to a force application member for the transmission of a turning torque at the other end, the screw shaft including a threaded section disposed between the screw tip and a thread-free section of the shaft, the thread-free section including the force application member, the threaded section including a shaft core and a thread, the threaded section further includes a core section axially displaced from the screw-tip, the core section has a polygonal core cross section with corners defining an enveloping circle having an enveloping circle diameter larger than a shaft diameter of the thread-free section of the shaft;
   wherein the thread runs along the entire core, including the polygonal core section, and the polygonal core section is provided within the threaded section adjacent the thread-free section of the shaft.

2. The screw according to claim 1, wherein the enveloping circle diameter of the polygonal core section is equal to or less than 1.4 times the shaft diameter of the thread-free section of the shaft.

3. The screw according to claim 1, wherein the enveloping circle diameter of the polygonal core section is between 1.1 and 1.2 times the shaft diameter of the thread-free section of the shaft.

4. The screw according to claim 1, wherein an outer thread edge defines a constant radius circle.

5. The screw according to claim 1, wherein the thread runs over the screw tip and an outer thread edge defines a continuously reducing radius spiral over the tip core.

6. The screw according to claim 5, further including a transitional section adjacent the tip, the transitional section having a transitional core with a constant polygonal core cross section corresponding to the cross section of the tip core directly adjacent the transitional section of the screw, the thread passes over the area of the transitional core of the transitional section with its outer thread edge forming a constant radius circle.

7. The screw according to claim 1, wherein the polygonal core section includes an axial length corresponding approximately a length of the threaded section having between one and six turns of the thread.

8. The screw according to claim 1, wherein the polygonal core cross section comprises an equilateral polygon having three to six sides.

9. The screw according to claim 1, wherein the thread-free section of the shaft transitions into a countersunk screw head.

* * * * *